Figure 1:
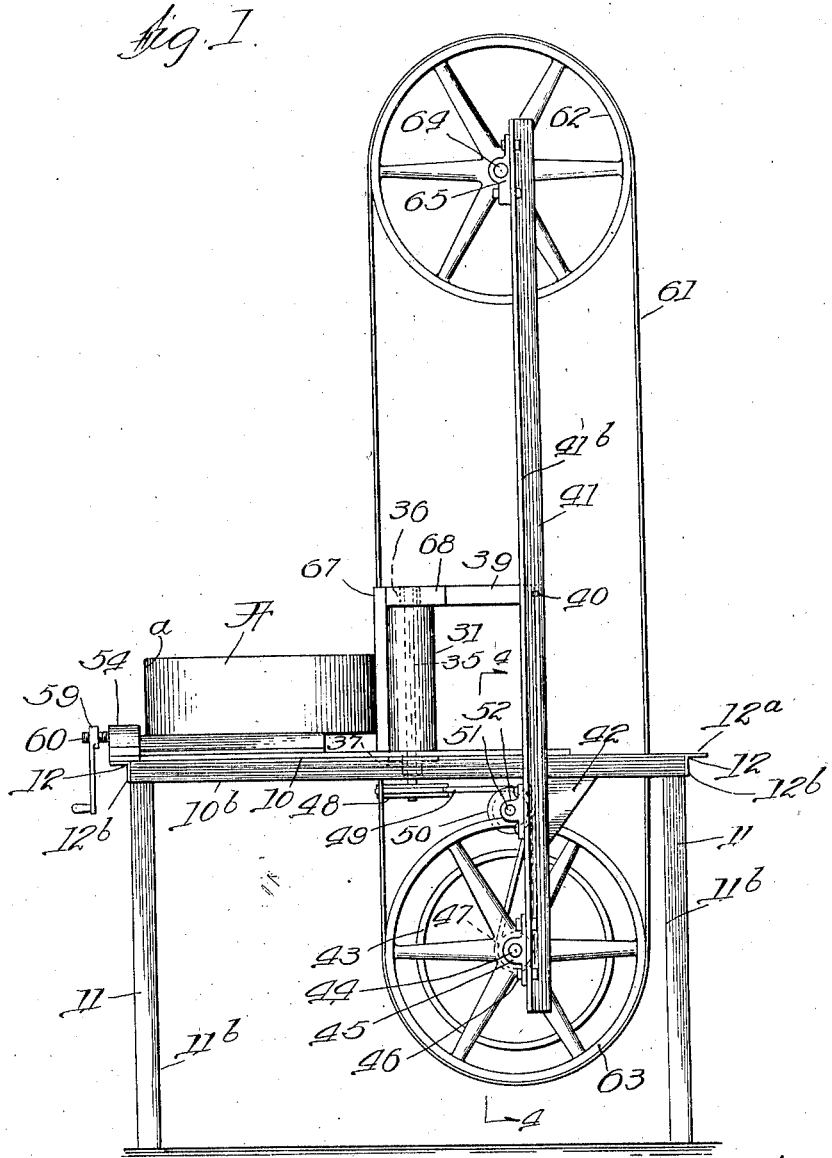

July 2, 1929.　　E. D. LOEWENTHAL　　1,719,229
CUTTING APPARATUS
Filed Oct. 31, 1927　　3 Sheets-Sheet 1

Inventor:
Edward D. Loewenthal
by Fred Gerlach
His Atty.

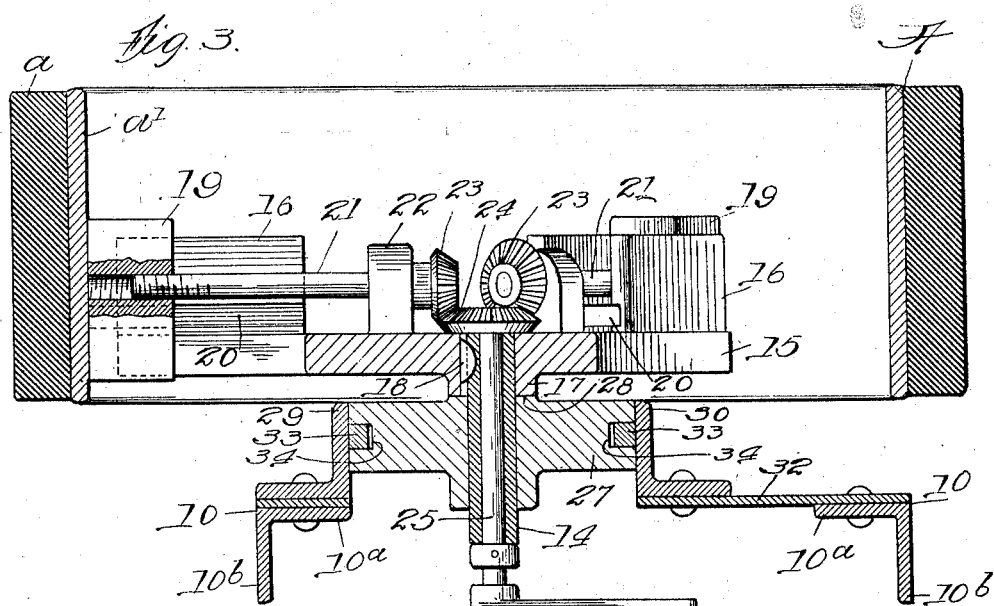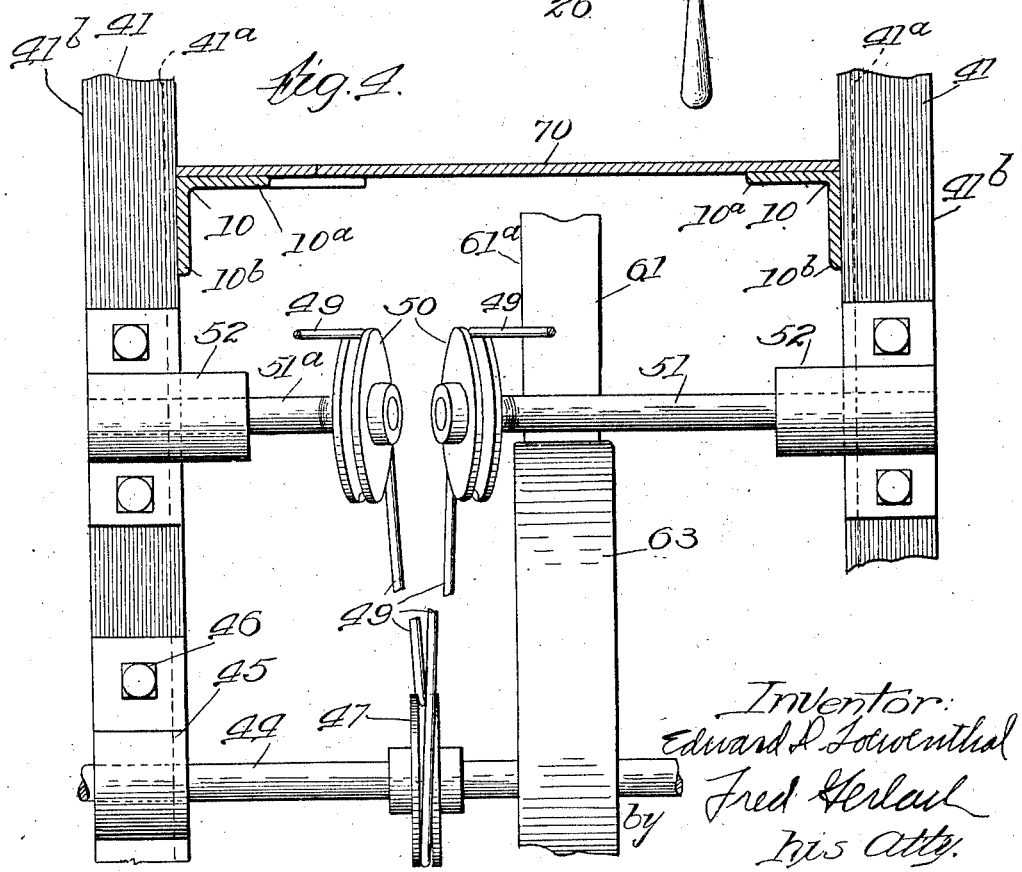

Patented July 2, 1929.

1,719,229

UNITED STATES PATENT OFFICE.

EDWARD D. LOEWENTHAL, OF CHICAGO, ILLINOIS.

CUTTING APPARATUS.

Application filed October 31, 1927. Serial No. 229,853.

The invention relates to cutting apparatus and more particularly to apparatus for cutting the thread from the rims of vehicle wheels of the solid rubber type.

Apparatus for this purpose has heretofore been proposed which embodied a stationary knife, a rotatable chuck for supporting the wheel, and manually operable mechanism for feeding the solid rubber tread into contact with the knife. In apparatus of this character the knife quickly dulls and the cut strip is of uneven thickness because of the irregularities which appear in the periphery of the tread and the difficulty in manually feeding the wheel into contact with the knife.

Other machines of this general character have been proposed but such machines have been concerned with the problems of completely removing the tread from the rims so that new rubber could be applied to renew the utility of the wheels. These machines have embodied no means or mechanism for cutting the rubber tread into a strip of uniform thickness.

One object of the present invention is to provide an apparatus for removing the tread from the rims of used hard or solid rubber vehicle wheels, which is an improvement on previous machines of this character, and in which provision is made for automatically cutting the tread into strips of uniform thickness regardless of depressions, rolls or other irregularities in the periphery thereof. In practice, many uses have been found for these strips particularly in connection with the manufacture of various commercial articles, such, for example, as door mats of the type that includes staggered rubber lengths. In general, the apparatus comprises a frame or supporting structure, a chuck for holding the wheel that is to be stripped of its tread, and a cylinder or roller which is rotated by any suitable mechanism. The chuck is movably mounted on the frame in suitable longitudinal guides and is subject to the action of the spring, which results in the wheel being pressed into contact with the drive cylinder. A movable knife, preferably in the form of a band or continuous strip is arranged in close proximity and in a fixed position with respect to the cylinder and is operable to cut the tread into a longitudinal strip as the wheel is rotated, due to its engagement with the cylinder. By rotating the wheel and arranging the knife in the manner set forth, complicated feed mechanism is dispensed with and the strip is of uniform thickness throughout its entire length, even though the wheel to which it was attached prior to cutting was undulatory.

Another object of the invention is to provide a machine or apparatus of this character which is efficient in its operation, consists of a comparatively small number of parts so that it may be manufactured at a low cost, and is of new and improved construction.

Other and more or less incidental objects will appear hereafter from the detailed description.

The invention consists in the several novel features hereinafter set forth and more particularly defined by the claims at the conclusion hereof.

Figure 2:
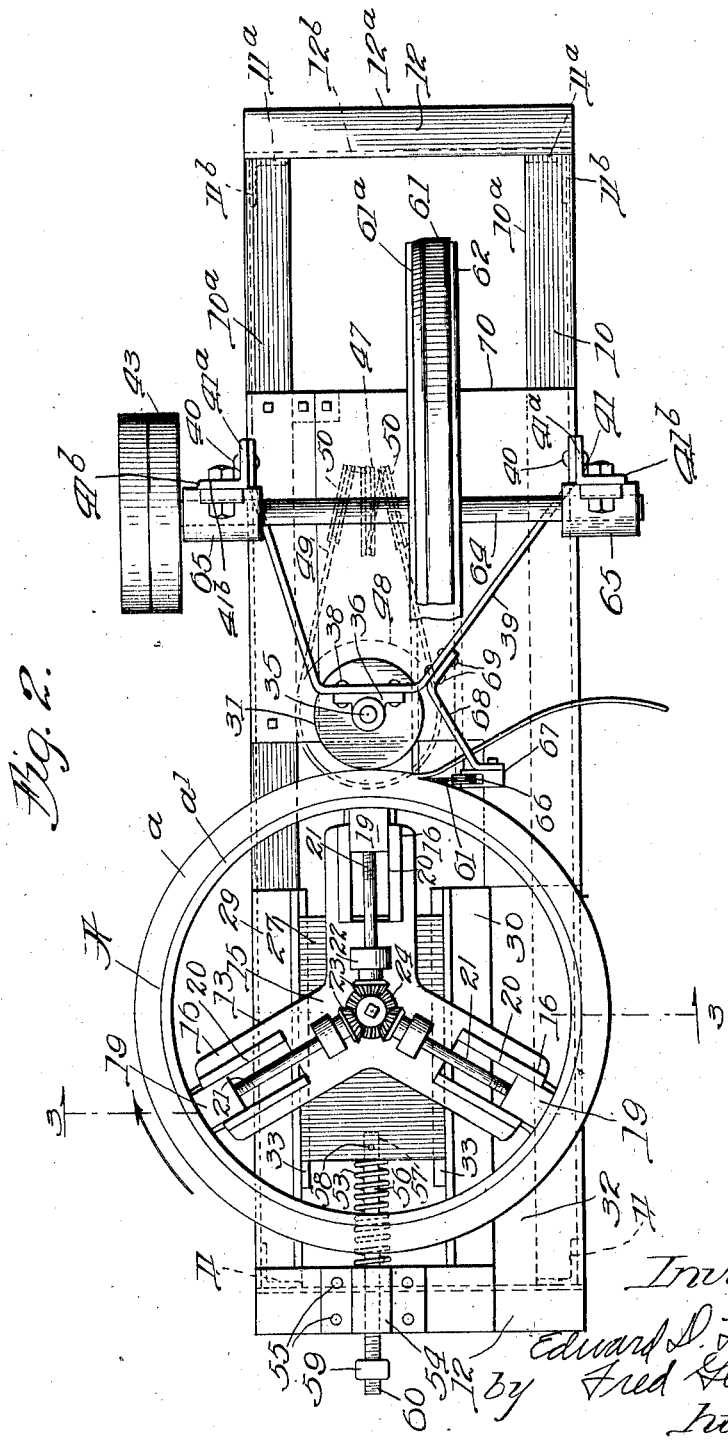

In the drawings which form a part of this disclosure or specification: Fig. 1 is a side elevation of an apparatus embodying the invention. Fig. 2 is a plan view, a portion of the knife being omitted for purposes of illustration. Fig. 3 is a section taken on line 3—3 of Fig. 2, showing in detail the mounting for the chuck and the operating crank and shaft therefor. Fig. 4 is a section taken on line 4—4 of Fig. 1, showing in detail the pulleys for driving the cylinder or roller.

The invention is exemplified in an apparatus for cutting the tread $a$ from the rim $a'$ of a used vehicle wheel A of the solid or hard rubber type. The apparatus comprises a rigid angle iron frame or supporting structure which consists of a pair of side bars 10 having horizontal top flanges $10^a$ and vertical flanges $10^b$ depending from the outer margins of the flanges $10^a$; vertical bars 11 which are disposed at the ends of the side bars and form supporting legs for the structure; and a pair of end bars 12. The vertical bars 11 have transversely extending flanges $11^a$ and flanges $11^b$ which extend longitudinally of the frame and are welded at their upper ends to the ends of the flanges $10^b$ to secure the bars 11 in their leg forming position. The end bars 12 operate to space the side bars 10 apart. These end bars have horizontal flanges $12^a$ and vertical flanges $12^b$ which are welded at their ends to the upper ends of the flanges $11^a$.

The wheel A is rotatably supported at the front end of the frame by means of a chuck 13, which is positioned above the side bars 10 and is arranged to rotate about a vertical axis. This chuck comprises a vertically extending tubular element 14 and a spider 15 having radially extending arms 16. The hub portion 17 of the spider extends around the upper end of the element 14 and is secured thereto against relative rotation by a key 18. Jaws 19 for engaging and gripping the inner periphery of the rim a' are slidably mounted in radially extending channels or ways 20 which are formed in the outer ends of the arms 16. These jaws are radially adjustable by means of screw-shafts 21 which are disposed above the arms 16 and are journalled in bearings 22 against endwise movement. The latter are shown in the form of lugs which are formed integrally with the spider 15 and project upwardly therefrom. The inner ends of the shafts 21 are provided with bevelled pinions 23 which mesh with a bevelled pinion 24. The latter is fixed to the upper end of a shaft 25 which extends through the tubular element 14. By rotating the shaft 25 the intermediary shafts and pinions operate to effect conjoint and uniform adjustment of the jaws 19. The adjustment of these jaws is such that wheels of different diameters may readily be applied to the chuck. A crank 26 is fixed to the lower end of the shaft 25 to permit the latter to be readily operated. The chuck 13 exemplifies a device for holding a used solid rubber vehicle wheel in a position whereby its tread is free to be cut from the rim. The chuck also exemplifies a device for this purpose which is adapted to hold wheels of different sizes.

The lower end of the tubular element 14 passes through and is rotatably mounted in a block or slab 27 which is disposed at one end of the frame. The chuck 13 is supported upon this block and its hub portion 17 rests upon a boss 28 which is formed integrally with the block and operates as a bearing for the chuck to rotate on. The block 27 is slidably mounted between a pair of longitudinally extending parallel and co-extensive guide members 29 and 30 so that the chuck may be shifted bodily to bring the periphery of the wheel which is mounted thereon against a drive cylinder or roller 31. The guide member 29 is suitably secured to the top flanges 10ª of one of the side bars 10. The guide member 30 is secured to the top face of a rectangular plate 32 which is fixed to the other side bar and the flange 12ª of one of the end bars. Each guide member is provided adjacent its inner face with a longitudinally extending rib 33 which fits into a groove 34 which is formed in the contiguous or contacting face of the block 27. The ribs 33 and grooves 34 exemplify means for supporting the block so that the latter may be shifted or reciprocated longitudinally of the frame.

The cylinder 31 against which the tread of the wheel A is pressed as hereinafter described, is rotated so as to impart movement to the wheel. This cylinder is mounted on a vertical shaft 35, the ends of which project beyond the ends of the cylinder and are mounted in bearing brackets 36 and 37. The top bracket 36 is connected by rivets 38 to the intermediate portion of a bracket strip 39. The ends of the latter extend rearwardly and outwardly and are riveted as at 40 to the inner flanges 41ª of a pair of angle iron standards 41. The lower bracket 37 is similarly connected to the standards. The latter are rigidly connected to the side bars 10, the flanges 41ª being welded to the vertical flanges 10ᵇ of said side bars. Triangular plates 42 are provided for the purpose of reinforcing the connection between the standards and the frame-bars 10. The mechanism for driving the cylinder 31 comprises a pulley wheel 43 which is driven, when desired, by a belt (not shown) and is mounted on one end of a shaft 44. The latter extends transversely to the frame and is mounted in bearing brackets 45 which are connected by bolts 46 to the outer flanges 41ᵇ of the standards. A pulley 47 is journalled on the central portion of the shaft 44 and is keyed to rotate therewith. This pulley is connected by a belt 49 to drive a pulley 48 which is mounted on the lower end of the cylinder-shaft 35. The central portion of the belt 49 passes around idler pulleys 50 which are loosely mounted on angular parts of a pair of shaft sections 51 and 51ª. The outer ends of these sections are fixed in bearing brackets 52 which are bolted, like the brackets 45, to the flanges 41ᵇ of the standards.

The block 27 is pressed toward the rear end of the frame to force the tread a into driving contact with the periphery of the cylinder 31 by means of a coiled spring 53. This spring is interposed between the block and a bracket 54 and is compressed to such a degree that its operative force is always sufficient to force the tread into firm contact or relation with the cylinder. The bracket 54 is connected by rivets 55 to the horizontal flange 12ª of the end member at the front of the frame. A guide shaft 56 extends through the spring to prevent displacement thereof. The inner end of this shaft extends into a socket 57 which is formed in the front face of the block and is held therein by a pin 58 which extends transversely through the block. The outer end of the shaft 56 is slidably mounted in the bracket 54 so that the shaft is free to move back and forth with the block. A crank 59 is connected to the outer end of the shaft 56 by a screw thread 60. This crank is normally positioned at the extreme outer end of the shaft so that it will not contact with the bracket 54 and impair or stop the inward movement of the block and chuck. When the wheel A is placed on or removed from the chuck it is essential that the spring 53 be rendered inoperative and the chuck and parts associated therewith be shifted away from the cylinder 31. This is accomplished by turning the crank 59 until it strikes against the outer end of the bracket 54 and pulls the shaft and incidentally the block and chuck outwardly a distance sufficient to free the tread *a* from contact with the cylinder. By unscrewing the crank to the position shown in Fig. 2, the spring again becomes operative to force the wheel and its supporting elements toward the drive cylinder.

During rotation of the wheel, the rubber tread *a* is cut from the rim in the form of a strip, by means of a knife 61 which has a blade 61$^a$ and is preferably of the band type. This knife is supported by an upper wheel 62 and a lower wheel 63. The latter is journalled on the pulley driven shaft 44 and is fixed by any suitable means to rotate therewith. The upper wheel 62 is an idler wheel and is positioned directly over the lower wheel, that is, in vertical alignment therewith. The wheel 62 is supported by a shaft 64, the ends of which are secured in brackets 65. These brackets are adjustably secured to the upper ends of the standards to permit the shaft 64 to be shifted vertically to take up any slack in the knife. The wheels 62 and 63 are arranged on their respective supporting shafts so that the front reach of the knife is at one side of the cylinder and is in such a position that it strikes the rubber tread substantially tangentially. This reach is arranged in close proximity to the cylinder and is held in a fixed position relatively thereto by means of a vertical series of rollers 66. The latter are mounted in a guide-member 67 which is supported by a pair of braces or arms 68. The rear ends of these arms are connected to the bracket strips 39 by means of rivets 69. The rollers have grooved peripheries for receiving the outer margin of the knife. By means of these grooves the knife is held against movement or deflection longitudinally of the frame. The rollers 66 exemplify guide means for maintaining the operative portion of the knife in a fixed position with respect to the cylinder 31. A characteristic of driving the wheel A and holding the knife as set forth, is that the strip which is cut from the tread *a* is of the same thickness throughout its entire length, regardless of any deformation or irregularity in the periphery of the tread. By using a rotary knife in lieu of a stationary one, the rubber is sheared away with a minimum amount of friction and without being compressed against the knife so that it is cut unevenly. The blade 61$^a$ is beveled on the side which is adjacent the wheel supporting elements so that it substantially conforms to the periphery of the tread. As a result, friction between the knife and the uncut portion of the tread is reduced to a minimum. The cut or strip portion of the tread passes in back of the knife and onto the floor. The knife while being held or positioned in close proximity to the cylinder 31 is spaced therefrom a sufficient distance to permit the rubber to expand into its normal condition after being compressed against the cylinder.

An L-shaped plate 70 is riveted to the top flanges of the side bars 10 and forms a top or surface for supporting the strip and preventing it from falling into contact with the mechanism for driving the cylinder.

The operation of the apparatus will be as follows: The crank 59 will first be rotated around the non-rotatable or fixed shaft 56 and into engagement with the bracket 54 to render the coiled spring 53 inoperative. In this abutting position continued rotation of the crank will pull the shaft 56 and incidentally the block 27 and chuck 13 outwards due to the operation of the screw thread 60. As soon as the chuck is shifted a sufficient distance from the cylinder 31 to permit placement of a wheel A thereon, cranking is discontinued. The crank 26 is then operated to shift the jaws 19 inwardly. The wheel which is to be stripped is then placed around the chuck and the jaws forced outwardly into locking engagement with the inner periphery of the rim *a'*. The crank 59 is then loosened to release the block and chuck so that they are subject to the action of the spring 53. The latter operates to force the thread *a* of the wheel into contacting relation with the periphery of the cylinder 31. When the operator of the apparatus desires to start the cutting operation, a motor driven belt is applied to the pulley wheel 43. Rotation of the latter drives the shaft 44 which in turn causes the cylinder 31 and the knife 61 to rotate. Rotation of the cylinder causes the wheel A to rotate and the tread *a* to be forced into contact with the operative reach of the knife. This portion of the knife is held and guided by the rollers 66 so that the cutting part of the blade 61$^a$ is disposed in a fixed position with respect to the cylinder. As a result the strip cut from the tread will be of a predetermined and uniform width throughout its entire length. Should irregularities such as depressions or rolls appear in the periphery of the tread, the wheel will accordingly shift forwards and backwards. This condition, however, has no effect upon the width of the strip because the knife is always at a predetermined distance from the periphery of the portion of the tread which is subject to the cutting operation. When the entire tread has been cut, the operator will stop the operation of the apparatus by removing the motor driven belt from the pulley wheel 43 or operating the crank 59 to shift the wheel out of engagement with the drive cylinder. The rubber cut from the wheel is in the form of a single strip. This strip may, if desired, be cut into lengths and used in the manufacture of rubber door mats or like articles.

The invention exemplifies an apparatus for cutting the tread from a used hard or solid rubber vehicle wheel or tire, which is of new and improved construction, and in which provision is made for automatically cutting the tread into a single longitudinal strip which is of uniform thickness throughout its entire length. The apparatus is simple in its construction, operates efficiently, and consists of but a small number of parts.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In an apparatus of the character described, the combination of a supporting structure, an abutment member, a chuck slidable on the structure to and from the abutment member and adapted to support rotatably a wheel having a solid rubber tread, a rotary knife positioned in fixed relation with respect to the abutment member and adapted to cut the tread from the rim of the wheel during rotation thereof, means including a spring for automatically shifting the chuck to feed the wheel against the abutment member so that the knife is operative to cut from the tread, during rotation of the wheel, an elongated strip of substantially uniform thickness throughout its entire length, and means for rotating the knife.

2. In an apparatus of the character described, the combination of a supporting structure, a device for rotatably supporting a wheel having a solid rubber tread, a roller, said device being slidably mounted on the supporting structure to permit the tread of the wheel to be brought into contact with the roller, spring means for pressing the device toward said roller, a knife for cutting the tread into strip form as the wheel is rotated, and means for driving the roller to rotate the wheel.

3. In an apparatus of the character described, the combination of a supporting structure, a device for rotatably supporting a wheel having a solid rubber tread, a roller, said device being slidably mounted on the supporting structure to permit the tread of the wheel to be brought into contact with the roller, a spring for pressing the device towards the roller, a knife for cutting the tread into strip form as the wheel is rotated, means for driving the roller to rotate the wheel, and means for rendering the spring inoperative and shifting the device away from the roller to disengage the tread from the drive roller.

4. In an apparatus of the character described, the combination of a supporting structure, a device for rotatably supporting a wheel having a solid rubber tread, a roller, said device being slidably mounted on the supporting structure to permit the tread of the wheel to be brought into contact with the roller, a knife, the edge of said knife being disposed in close proximity to the roller and adapted to engage the tread substantially tangentially to cut the tread into strip form as the wheel is rotated, and means for driving the roller to rotate the wheel.

5. In an apparatus of the character described, the combination of a supporting structure, a device for rotatably supporting a wheel having a solid rubber tread, a roller, said device being slidably mounted on the supporting structure to permit the tread of the wheel to be brought into contact with the roller, means for driving the roller to rotate the wheel, a band having a knife edge, means for supporting the band so that one margin thereof is operative to cut the tread in strip form as the wheel is rotated, and means for driving the band.

6. In an apparatus of the character described, the combination of a supporting structure, a chuck-member for rotatably supporting a wheel having a solid rubber tread, a roller-member, said chuck-member being movably mounted on the frame to permit the tread of the wheel to be brought into contact with the roller-member, means for driving one of the members to rotate the wheel, and a knife positioned in fixed relation with respect to the roller-member and operative, during contact of the tread and said roller-member and drive of the wheel, to cut from the tread an elongated strip of substantially uniform thickness throughout its entire length.

7. In an apparatus of the character described, the combination of a supporting structure, a chuck for rotatably supporting a wheel having a solid rubber tread, a roller, said chuck being movably mounted on the frame to permit the tread of the wheel to be brought into contact with the roller, means for driving the roller so as to cause rotation of the wheel when the tread is in contact with the roller, and a knife positioned in fixed relation with respect to the roller and operative, during rotation of the wheel, to cut from the tread an elongated strip of substantially uniform thickness throughout its entire length.

8. In an apparatus of the character described, the combination of a supporting structure, a chuck for rotatably supporting a wheel having a solid rubber tread, a roller, said chuck being slidably mounted on the frame to permit the tread of the wheel to be brought into contact with the roller, means for driving the roller so as to cause rotation of the wheel when the tread is in contact with the roller, a rotary knife positioned in fixed relation with respect to the roller and operative, during rotation of the wheel, to cut from the tread an elongated strip of substantially uniform thickness throughout its entire length, and means driven conjointly with the roller driving means for rotating the knife.

9. In an apparatus of the character described, the combination of a supporting structure, an abutment member, a chuck slidable on the structure to and from the abutment member and adapted to support rotatably a wheel having a solid rubber tread, a knife positioned in fixed relation with respect to the abutment member for cutting the tread from the wheel during rotation of the latter, and means including a spring for automatically shifting the chuck to feed the wheel against the abutment member so that the knife is operative to cut from the tread, during rotation of the wheel, an elongated strip of substantially uniform thickness throughout its entire length.

Signed at Chicago, Illinois, this 22d day of October, 1927.

EDWARD D. LOEWENTHAL.